July 20, 1937.  H. LEVINE  2,087,773

CARTON

Filed Feb. 8, 1935  4 Sheets-Sheet 1

Inventor
HENRY LEVINE
By *[signature]*
Attorney.

July 20, 1937. H. LEVINE 2,087,773
CARTON
Filed Feb. 8, 1935 4 Sheets-Sheet 2
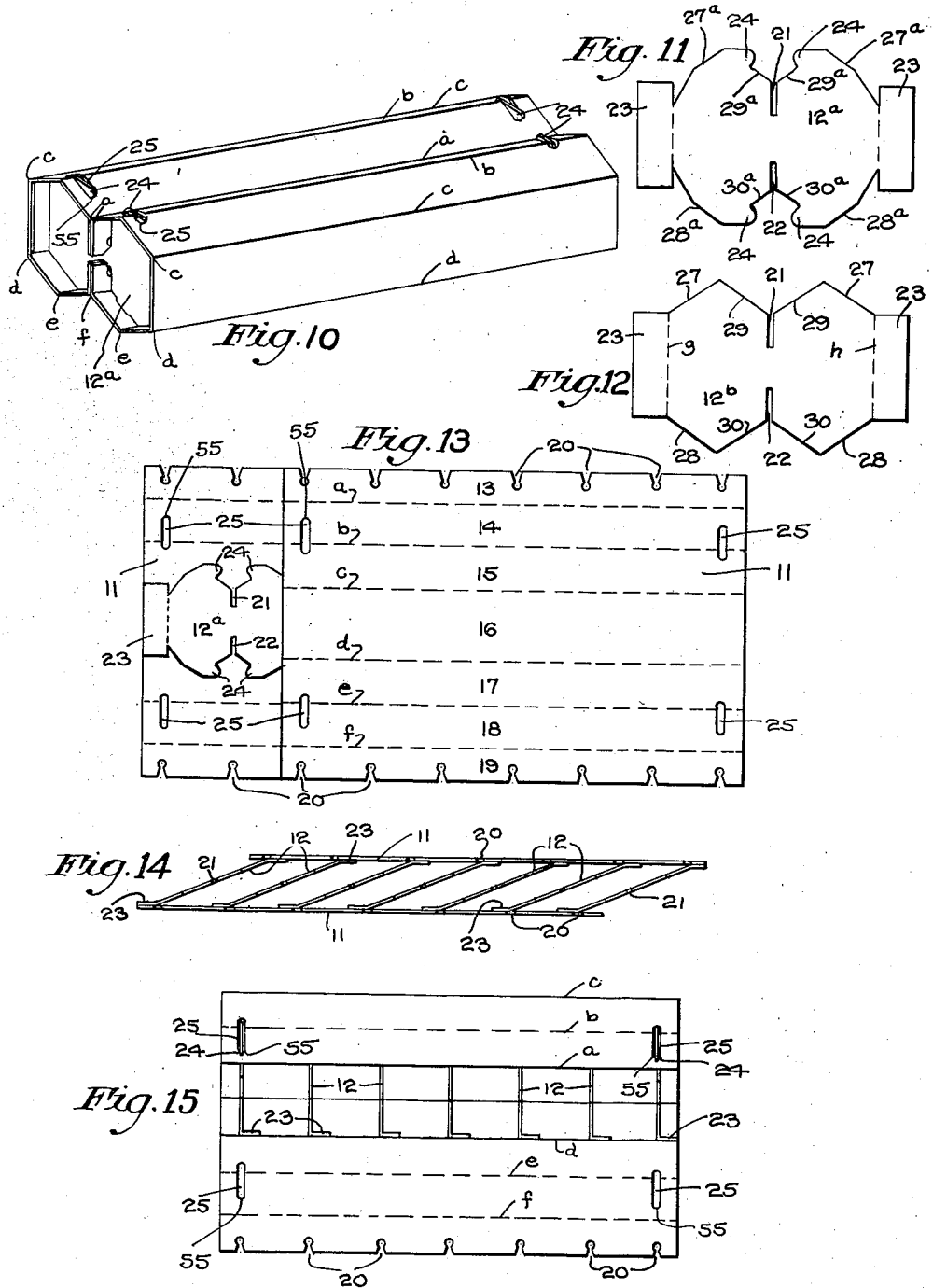
Inventor
HENRY LEVINE
By Lee Edelson
Attorney.

July 20, 1937.  H. LEVINE  2,087,773
CARTON
Filed Feb. 8, 1935  4 Sheets-Sheet 3
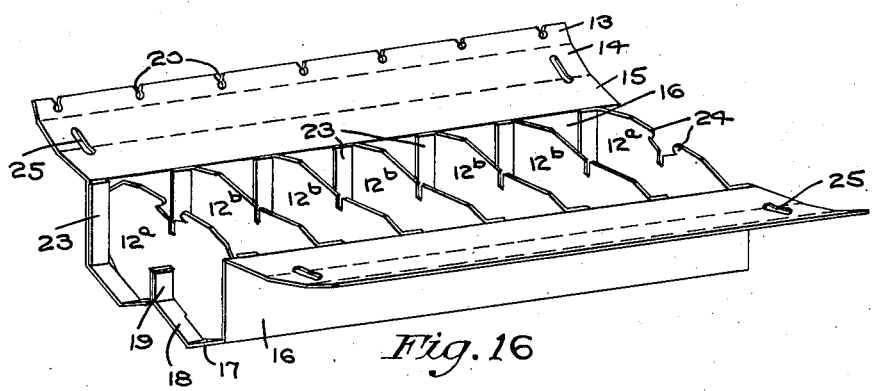
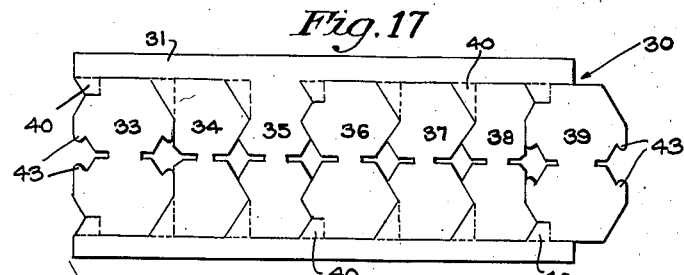
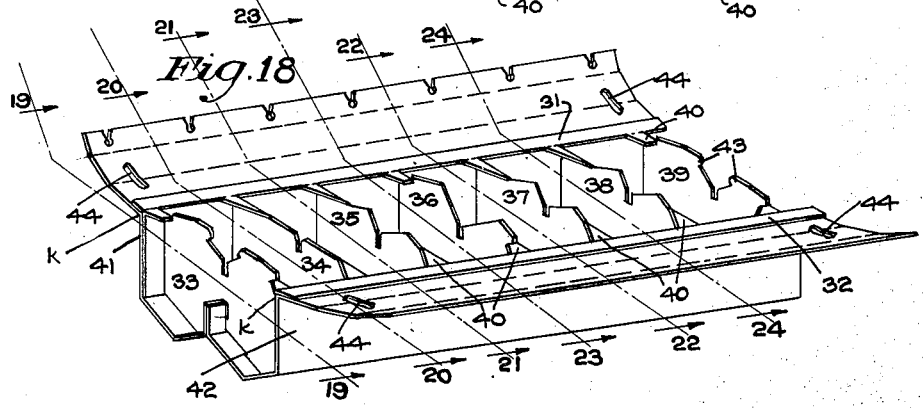
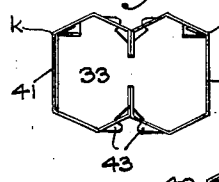 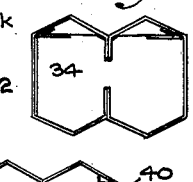 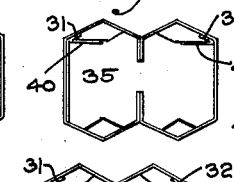 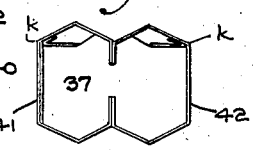
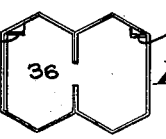 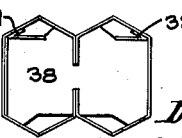
Inventor
HENRY LEVINE
By Fred Edelson
Attorney.

July 20, 1937. H. LEVINE 2,087,773
CARTON
Filed Feb. 8, 1935 4 Sheets-Sheet 4
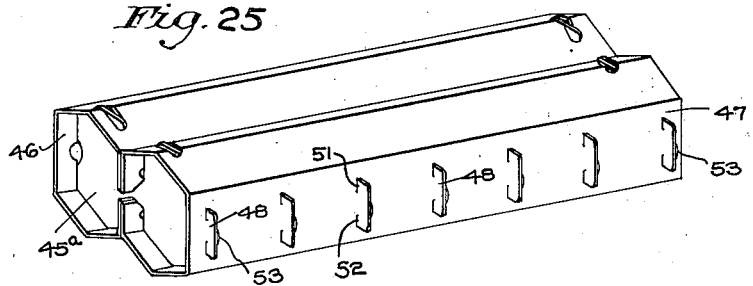
Fig. 25
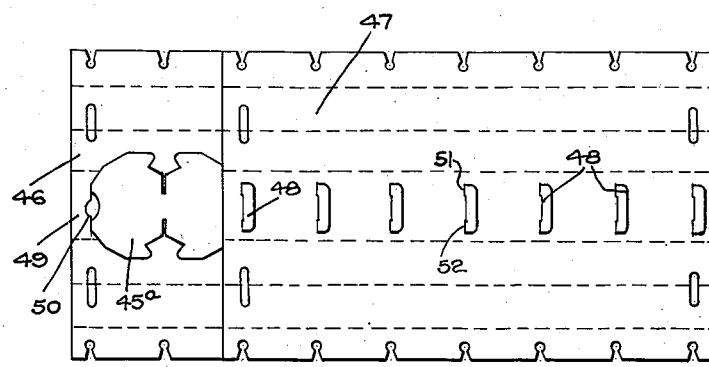
Fig. 26
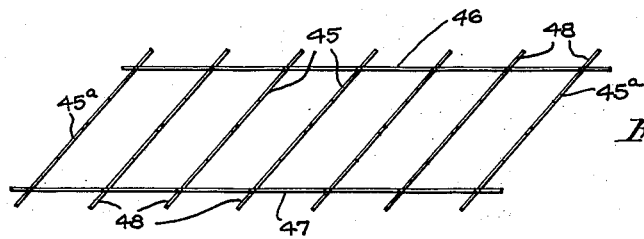
Fig. 27
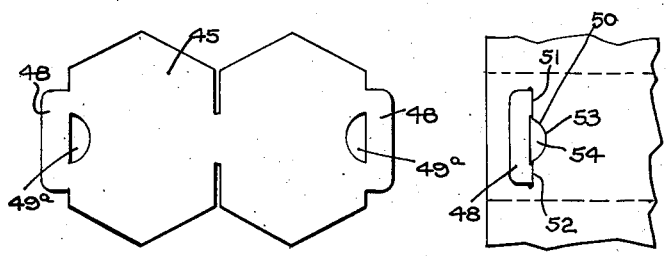
Fig. 28
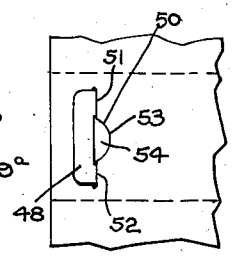
Fig. 29
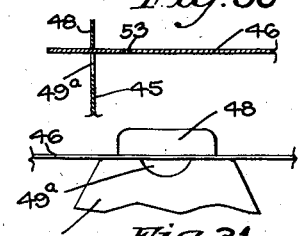
Fig. 30
Fig. 31
Inventor
HENRY LEVINE
By Earl Edelson
Attorney Patented July 20, 1937

2,087,773

UNITED STATES PATENT OFFICE 2,087,773

CARTON

Henry Levine, Philadelphia, Pa.

Application February 8, 1935, Serial No. 5,529

7 Claims. (Cl. 229—29)

This invention relates to improvements in the design and construction of cellular cartons of the collapsible type.

Among the principal objects of the present invention is to provide a cellular carton for receiving such fragile commodities as eggs and the like, the carton being adapted to be collapsed into a substantially flat unit whereby a large quantity thereof may be conveniently stored into a relatively small space, a similar saving in space being obtained during the shipment of the collapsed cartons.

Still another and important object of the present invention is to provide a cellular carton which is readily assembled into expanded form for the reception of the articles intended to be received therein, the expanding of the carton into article receiving shape being effected manually and without the necessity of employing any special auxiliary apparatus.

A further object is the provision of a cellular carton for receiving fragile articles which is symmetrical not only about its longitudinally extending vertical medial plane but also about its longitudinally extending horizontal medial plane, in consequence of which the carton is provided with similar top and bottom sections, thereby permitting it to be reversed top for bottom without in any wise endangering the contents of the carton.

A still further object of the invention is the provision of a carton both the top and bottom of which are of such design and construction as to afford shock absorbing means for preventing injury to the contents of the carton, the contents being cushioned against shock in the top of the carton as well as in the bottom thereof.

Other objects and advantages of the invention will be apparent more fully hereinafter, it being understood that the present invention consists substantially in the combination, construction, location and relative arrangement of parts, all as shown in the accompanying drawings, as described more particularly hereinafter, and as finally pointed out in the appended claims. It is to be understood further that the invention is not intended to be limited to any one of the particular forms of carton hereinafter described and shown in the drawings. Instead, the constructional details of a carton embodying the principles of the present invention may be varied within wide limits, as illustrated by the several modifications shown in the accompanying drawings, all without departing from the real spirit or general principles of the invention.

In the said accompanying drawings:—

Figure 10 is a perspective view of the carton in closed condition;

Figure 11 is a view of one of the end transversely extending partition members;

Figure 12 is a similar view of the intermediate transversely extending partition members;

Figure 13 is a view showing the carton in collapsed substantially flat condition;

Figure 14 is a side elevational view of the carton in partially flattened condition;

Figure 15 is a top plan view of the carton partially opened;

Figure 16 is a perspective view of the carton illustrated in Figures 1 to 15 showing the top thereof entirely open;

Figure 17 is a plan view of the blank forming the transverse partitions of a modified form of the carton;

Figure 18 is a perspective view of the modified form of carton, the top thereof being shown open;

Figures 19 to 24, inclusive, are sectional views taken respectively along the lines 19—19, 20—20, 21—21, 22—22, 23—23 and 24—24 of Figure 18 when the top of the carton shown in the latter figure is closed.

Figure 25 is a perspective view showing in closed condition still another modified form of the carton;

Figure 26 is a plan view showing the carton of Figure 25 in collapsed, flattened condition;

Figure 27 is a view showing the carton of Figure 25 in partially collapsed condition;

Figure 28 is a view of one of the intermediate transverse partitions of the carton of Figure 25; and Figures 29 to 31 are views showing the mode of interlocking one end of a transverse partition to one of the side walls of the carton.

Figure 1:
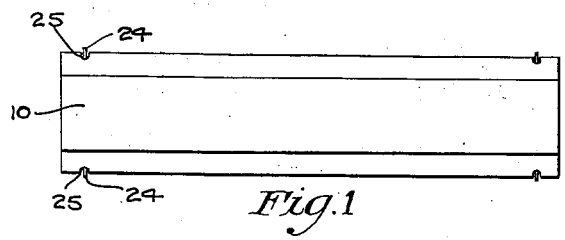
Figure 1 is a side elevational view of one form of carton as constructed in accordance with the present invention.
Figure 2:
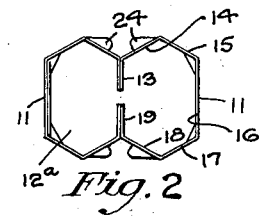
Figure 2 is an end elevational view thereof.
Figure 3:
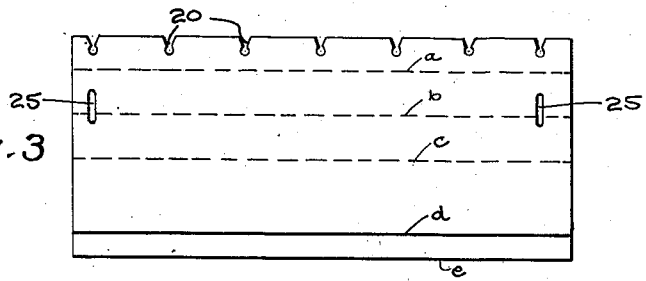
Figure 3 is a side elevational view showing the carton partially opened.
Figure 4:
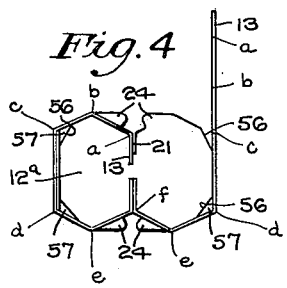
Figure 4 is an end elevational view of the carton when in the condition shown in Figure 3.
Figure 5:
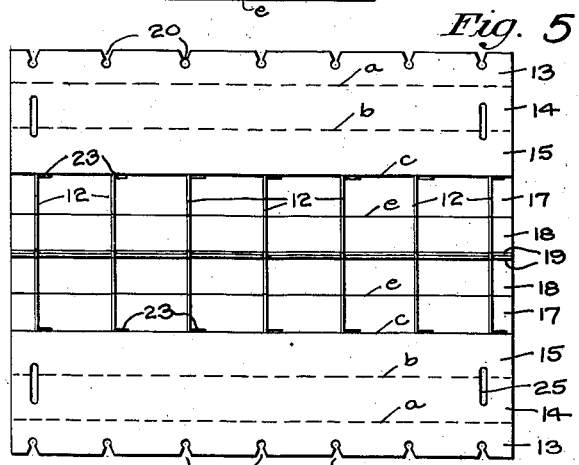
Figure 5 is a top plan view of the carton entirely open.
Figure 6:
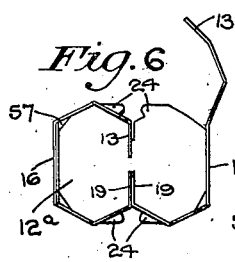
Figures 6 to 9 are end elevational views showing the carton in various stages during the operation of expanding it into article receiving form.
Figure 7:
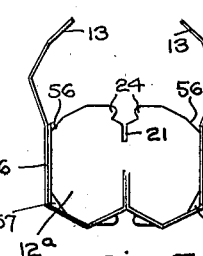
Figure 8:
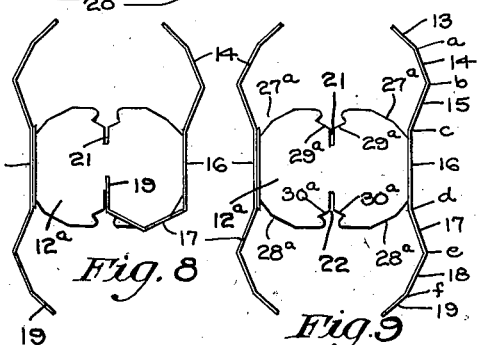
Figure 9:
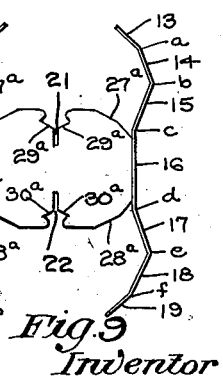

Referring now to the drawings and more particularly to Figures 1 to 16, inclusive, which illustrate one preferred form of the carton constructed in accordance with the present invention, it will be observed that the carton 10 is composed of a pair of similar side panels 11—11 which are interconnected by a plurality of transversely extending cross-partitions 12. Each of the side panels 11—11 is formed of a single blank of suitably stiff material, such as card-board, fibre stock or the like, and is longitudinally scored along the lines a—b—c—d—e—f to provide a plurality of relatively foldable sections 13, 14, 15, 16, 17, 18, and 19. The opposed edges of the sections 13 and 19 of each side panel are notched, as at 20, at longitudinally spaced intervals for a purpose which will be apparent hereinafter.

The transversely extending cross partitions 12 are all of the same general outline, the number employed being dependent upon the number of cells to be provided in the carton. Thus, in the carton illustrated, seven cross partitions are employed to form a carton having twelve cells. The cross partitions 12 are each in the form of a separate blank cut to provide top and bottom edges of generally zig-zag shape, each of said blanks being further centrally notched, as at 21 and 22, along the central vertically disposed axis of the blank. Each blank is moreover provided at opposite ends thereof with tabs 23—23 which are adapted to be bent, at right angles to the plane of the blank, along the scored lines g and h.

The endmost cross partition blanks 12a (one of which is illustrated in Figure 11) differ from the intermediate cross partition blanks 12b (see Figure 12) in that the top and bottom edges thereof are each cut to provide a pair of lid-locking projections 24—24, the latter being arranged in opposed relation and to either side of the common axis of the central notches 21 and 22.

In the form of carton illustrated in Figures 1 to 16, the cross partition members 12 are secured in transversely extending relation between the opposed side panels 11—11 of the carton, this being effected preferably by respectively gluing the tabs 23—23 of each member 12 to the central section 16 of the side panels. The cross partition members are arranged in longitudinally spaced relation between the side panels so that when the latter are brought into opposed alinement with each other, the notches 21—22 of the several partition members respectively lie in the planes of the alined notches 20 formed in the free edges of the side panels. Each of the side panels is provided with elongated apertures 25 corresponding in number to and adapted for registry with the lid-locking projections 24—24 of the two endmost cross partition members, the projections 24 and the apertures 25 coacting to lock the carton in its expanded form, as is shown most clearly in Figures 1, 6, 10, and 15.

Figures 13 and 14 show the carton in its collapsed condition wherein it will be observed that the side panels 11—11 are superposed one against the other with the cross partitions 12 disposed in flattened condition therebetween. In this collapsed condition of the carton, the panels 11—11 are necessarily offset longitudinally with respect to each other, the extent of this displacement being limited by the width of the cross partition member.

To assemble the carton into its expanded, article-receiving form, the panels 11—11 are shifted longitudinally of each other so that their corresponding ends are in alinement, it being understood, of course, that when this is accomplished the panels 11—11 are necessarily spaced from each other a distance equal to the effective width of the cross partition members. This is shown most clearly in Figure 9. Thereafter, the relatively foldable sections of each panel are folded about the bottom and top edges of the partition members to complete the expanding of the carton into what may be best described as a figure 8 configuration.

It will be observed that in the operation of expanding the carton into article-receiving form the sections 16—16 of the opposed side panels are maintained in substantial parallelism. The sections 15 and 17 of each side panel respectively engage the inclined edges 27 and 28 of the intermediate partition members 12b as well as the similarly inclined edges 27a and 28a of the endmost partition members 12a. The sections 14 and 18 of each side panel are respectively adapted to fold over upon and engage the inclined edges 29 and 30 of the intermediate cross partition members as well as the inclined edges 29a and 30a of the endmost cross partition members. The opposed marginal sections 13 and 19 of each side panel are respectively inserted into the opposed notches 21—22 of the several partition members, it being observed in this latter connection that the notches 20 provided in the free edges of the sections 13 and 19 respectively coact with the said notches 21—22 to permit the sections 13 and 19 to be projected toward each other sufficiently to provide what is in effect a longitudinally extending partition within the carton. In other words, the opposed marginal sections 13 and 19 of the side panels when properly interlocked with the transverse partitions divide the carton into two longitudinally extending rows of six cells each, the number of cells in each row depending, of course, upon the number of transverse partitions employed.

In the operation of expanding the carton as just described, the sections 14 and 18 of each side panel are manipulated to permit the lid-locking projections 24—24 to project through the corresponding apertures 25 formed in the said sections 14 and 18, the inherent resiliency of the material of which the carton is formed being itself sufficient to maintain the lid-locking projections 24 in locking engagement with the sections 14 and 18 of the carton, thereby preventing the carton from being accidentally or unintentionally opened.

With the carton expanded as just described, it will be observed that the sections 14 and 15 of each side panel conjointly form inverted V-shaped tops for each row of the carton cells, while the sections 17 and 18 of each side panel form corresponding V-shaped bottoms for each row of said cells. Thus, the carton is fully cushioned in its top as well as in its bottom and so prevents injury or damage to any fragile articles which may be contained therein.

To open the carton it is merely necessary to withdraw from engagement with the transverse partitions one or more of the top or bottom sections of the carton. Thus, in Figure 6 the right-hand top section is shown withdrawn to permit access to the top of one row of the carton cells, while in Figure 7 both top sections are shown in opened condition to afford access to the entire top of the carton, this latter condition of the carton being further shown in perspective in Figure 16.

Figures 17 to 24, inclusive, show a modified form of the invention wherein the transverse partitions are not secured as independent members to the opposed side panels but instead are in the form of a unitary assembly constructed of a single blank 30. This blank is cut and scored to provide a pair of opposed longitudinally extending securing strips 31—32 and a plurality of transverse partition members 33—34—35—36—37—38 and 39. Each of these transverse partition members 33 to 39, inclusive, is secured at corresponding opposite corners thereof to the opposed pair of securing strips 31—32, the supporting gussets for the partition members being generally designated 40.

In the construction of this modified type of carton, the securing strips 31 and 32 of the transverse partition member blank are respectively secured to the side panels 41 and 42 of the carton. These side panels 41 and 42 are similar in all respects to the side panels 11—11 of the modification above described. Preferably, the securing strips 31 and 32 of the blank shown in Figure 17 are respectively glued or otherwise secured to the upper sections of the opposed side panels 41 and 42 of the carton immediately above the scored line $k$ (this scored line $k$ in Figures 18 et seq. corresponding to the scored line $c$ of the side panel shown in Figure 13).

With the blank 30 secured in position between the side panels 41 and 42, as just described, the transverse partition members of the said blank 30 are each rotated about their supporting gussets 40 so that all of the transverse partitions 33 to 38 assume a substantially parallel relation, the top and bottom sections of the carton being then brought into engagement with the transverse partitions exactly as in the manner described heretofore in connection with the carton of Figures 1 to 16. It will be observed that the intermediate transverse partition members 34, 35, 36, 37, and 38 of the modified form of carton are not identical with one another so far as their top and bottom edges are concerned. However, it will be noted that all of these partition members have this common characteristic, namely, that the top and bottom edges of each thereof is provided with inclined sections at one point or another to provide an adequate support for the angularly inclined top and bottom sections of the opposed panels 41 and 42. This is all shown quite clearly in Figures 20 to 23 in view of which a detailed description of the top and bottom edge configurations of the several partition members is not deemed necessary. It is to be observed, however, that the endmost partition members 33 and 39 are substantial duplicates of one another and generally correspond in shape to the endmost partition members of the carton first described above. As in the former instance, the partition members 33 and 39 are each provided with the locking projections 43—43 for coaction with the elongated slots 44—44 correspondingly provided in the top and bottom sections of the panels 41 and 42 for effectively locking said sections in closed position.

Figures 25 to 31, inclusive, illustrate still another modification of the present invention wherein the cross partition members 45 while formed as independent elements, as in the first instance above described, are adapted to be secured in position between the side panels 46 and 47 of the carton by interlocking tongue and slit means instead of by gluing. In order to effect this, each of the transverse partition members is provided at either end thereof with a projecting tab 48 and is further provided in the immediate vicinity of this tab with a semi-circular aperture 49a. In all other respects, the transverse partition members of the carton shown in Figures 25 et seq. are similar to those of the carton first described above and this applies as well to the two endmost transverse partitions, one of which is designated as 45a in Figure 26.

The side panels 46 and 47 of this last form of the carton are each provided in the intermediate sections 49—49 thereof with a plurality of longitudinally spaced slits designated 50 in Figures 26 and 29. As appears in these figures, these slits are each of a form having a pair of opposed straight cuts 51—52 interconnected by an arcuate cut 53.

The cross partition members 45 detachably interconnect the side panels 46 and 47 of the carton by the expedient of inserting the opposed tabs 48—48 of each partition member respectively through the corresponding slits 53 of each side panel. The tab 48 of each partition member is slipped through from the inside surface of the carton side panel in such manner that the tab 48 is disposed exteriorly of the intermediate section 49 of the side panel. Thereupon, by swinging the transverse partition member into a position substantially at right angles to the side panel the segment 54 of the panel, which is defined by the arcuate slit 53, projects across and through the semi-circular aperture 49a in the transverse partition whereby to prevent withdrawal of the latter laterally away from the side panel to which it is connected. All of the tabs 48 are similarly connected to the side panels and when this is effected, the carton is ready to be expanded into article-receiving form exactly as described in the case of the first-described modification of the invention.

As has been mentioned heretofore with reference particularly to the carton illustrated in Figures 1 to 16, inclusive, the opposed projections 24 provided in the top and bottom edges of each of the endmost cross partition members 12a are adapted to be projected through the apertures 25 formed in the side members 11—11. As appears most clearly in Figures 2, 10, and 14, the side projections 24 project somewhat beyond the inner extremity of its corresponding slot 25. In order to effect the projection of each element 24 through its corresponding slot 25, the cover-forming section of the side member 11 is drawn inwardly so that the inner extremity 55 of the slot 25 (see Figures 10 and 15) clears the projection 24, whereupon the section 14 of the member 11 may be pressed downwardly into the position shown in Figure 10, the resiliency of the material of which the carton is formed being in itself sufficient to maintain the extremity 55 of the slot 25 within the notch formed immediately beneath the locking projection 24. To further facilitate this action and to insure a more positive interlocking between the extremity 55 of the slot 25 and the notch formed beneath the projection 24, the outer corner of each of the endmost transverse partition members 12a may be cut off, as at 56. This provides a clearance 57 between each outer corner of the endmost partition members 12a and the embracing sections of the side panel members 11—11, this clearance being advantageous in that it permits inward flexing of the corners of the carton in the immediate vicinities of the scored lines $c$—$c$ and $d$—$d$ during the operation of interlocking the projection 24 with its corresponding slot 25.

It will be understood, of course, that the provision of the chamfered corners 56 in the endmost partition members of the carton is not absolutely essential, because even in the absence thereof the projections 24 coact with the corresponding slots 25 to adequately secure the top and bottom sections of the carton in closed positions. However, it is preferable to chamfer the corners of those partition members which are provided with the locking projections 24 and this may be done as well in the modified forms of carton illustrated and described as in the carton shown in Figures 1 to 16, inclusive. Moreover, it will be understood that the locking projections 24 need not necessarily be confined to the endmost cross partition members but instead may be provided on one or more of the intermediate cross partition members, in which latter event, of course, the side members 11—11 of the carton are suitably slotted to accommodate the locking projections wherever they may be. It is preferable, however, to locate the locking projections at either end of the carton, both in the top and in the bottom thereof because experience has shown that by doing so the carton is most satisfactorily locked against being accidentally or unintentionally opened. While reference has been made in the specification and in the claims to a "bottom" and a "top", it will be apparent that actually the top and bottom formations of the carton are similar so that either one or the other may be considered as the top of the carton. It will be understood therefore that in referring to the top or to the bottom of the carton, it is intended merely to designate the upper or lower portion thereof as it appears in the drawings illustrating the invention.

It will be understood, of course, that the invention is susceptible of various changes from time to time without departing from the real spirit or general principles thereof and it is accordingly intended to claim the same broadly, as well as specifically, as indicated by the appended claims.

What is claimed as new and useful is:—

1. A collapsible cellular carton comprising, in combination, a pair of similarly shaped side panels, and a plurality of transverse members interconnecting said side panels, said transverse members being each symmetrical about their vertical axes with the top and bottom edges thereof oppositely inclined to provide a pair of laterally spaced peaks in the top and bottom of each transverse member, the said side panels being each provided with relatively foldable sections projecting above and below said transverse partitions and adapted to be folded over the peaks of said transverse partitions to provide an expanded carton of substantial figure 8 cross-section.

2. A collapsible cellular carton comprising, in combination, a pair of similarly shaped side panels, a plurality of transverse members interconnecting said side panels, said transverse members being each symmetrical about their vertical axes with the top and bottom edges thereof oppositely inclined to provide a pair of laterally spaced peaks in the top and bottom of each transverse member, the said side panels being each provided with relatively foldable sections projecting above and below said transverse partitions and adapted to be folded over the peaks of said transverse partitions to provide an expanded carton of substantial figure 8 cross-section, and coacting means in the opposed marginal edges of each side panel and in each of the transverse partitions for releasably interlocking each of said marginal edges commonly with all of said transverse partitions.

3. In a collapsible cellular carton, in combination, a pair of opposed side panels each formed of a separate blank and being longitudinally scored to provide relatively foldable sections, said side panels being adapted to be folded about said scored lines so that the relatively foldable sections thereof form a tube of substantially hexagonal shape, the pair of tubes so formed being contiguously disposed with the free marginal sections of each tube disposed in vertical alignment with each other and in flatwise engagement with the corresponding marginal sections of the adjoining tube, and a plurality of transverse partitions interconnecting the opposed side panels and in interlocking engagement with the free marginal sections thereof whereby to maintain the tubes in the hexagonal expanded shape aforesaid.

4. In a collapsible cellular carton, in combination, a pair of opposed side panels each formed of a separate blank and being longitudinally scored to provide relatively foldable sections, said side panels being adapted to be folded about said scored lines so that the relatively foldable sections thereof form a tube of substantially hexagonal shape, the pair of tubes so formed being contiguously disposed with the free marginal sections of each tube disposed in vertical alignment with each other and in flatwise engagement with the corresponding marginal sections of the adjoining tube, and a plurality of transverse partitions interconnecting the opposed side panels and in interlocking engagement with the free marginal sections thereof whereby to maintain the tubes in the hexagonal expanded shape aforesaid, each of said transverse partitions being of a perimetric outline to substantially fill the space formed within the said contiguous hexagonally shaped tubes.

5. In a collapsible cellular carton, in combination, a pair of side panels independently formed of separate blanks and longitudinally scored to provide each panel with relatively foldable sections the intermediate sections of the said panels being adapted for disposition in substantially parallel relation to constitute the opposed side walls of the carton, the remaining sections of each panel which extend oppositely to either side of the intermediate section constituting the top and bottom portions of the carton, and a plurality of transverse partition members extending between and interconnecting the opposed intermediate section of said side panels, said transverse partition members being arranged in spaced parallel relation when the carton is in its expanded form and including means for retaining in position the sections of the side panels which form the top and bottom of the carton.

6. In a collapsible cellular carton, in combination, a pair of independently formed members, each of which is longitudinally scored to permit the same to be folded to provide one side wall and the portions of the top and bottom walls of the carton immediately adjoining said side wall, and a plurality of transverse partition members extending between and interconnecting the sections of said members which form the opposed side walls of the carton, the top and bottom edges of said transverse partitions being reversely inclined to provide in each top and bottom edge thereof a pair of laterally spaced peaks, the longitudinally aligned peaks of the several partition members being adapted to be respectively embraced by each of the top and bottom forming sections of said first-mentioned members.

7. In a collapsible cellular carton, in combination, a pair of independently formed members, each of which is longitudinally scored to permit the same to be folded to provide one side wall and the portions of the top and bottom walls of the carton immediately adjoining said side wall, a plurality of transverse partition members extending between and interconnecting the sections of said members which form the opposed side walls of the carton, the top and bottom edges of said transverse partitions being reversely inclined to provide in each top and bottom edge thereof a pair of laterally spaced peaks, the longitudinally aligned peaks of the several partition members being adapted to be respectively embraced by each of the top and bottom forming sections of said first-mentioned members, and means provided in at least one of said transverse partitions for coaction with the said top and bottom forming sections of said first-mentioned members for preventing accidental or unintentional opening of the carton.

HENRY LEVINE.